United States Patent [19]

Sivakumar et al.

[11] Patent Number: 5,560,832
[45] Date of Patent: Oct. 1, 1996

[54] DEMULSIFICATION OF OILY WASTE WATERS USING SILICON CONTAINING POLYMERS

[75] Inventors: Ananthasubramanian Sivakumar, Naperville; Manian Ramesh, Lisle, both of Ill.

[73] Assignee: Nalco Chemical Company, Naperville, Ill.

[21] Appl. No.: 438,131

[22] Filed: May 8, 1995

[51] Int. Cl.⁶ ............................. B01D 17/05; C02F 1/56
[52] U.S. Cl. ................. 210/708; 210/734; 210/735; 252/341; 252/344; 252/358
[58] Field of Search .................... 210/708, 725, 210/727, 728, 735, 734; 252/329, 344, 341, 358

[56] References Cited

U.S. PATENT DOCUMENTS

| | | | |
|---|---|---|---|
| 3,624,019 | 11/1971 | Anderson et al. | 260/29.6 H |
| 4,026,794 | 5/1977 | Mauceri | 210/708 |
| 4,120,815 | 10/1978 | Raman | 210/708 |
| 4,151,202 | 4/1979 | Hunter et al. | 260/567.6 R |
| 4,154,698 | 5/1979 | Doft | 210/708 |
| 4,160,742 | 4/1979 | Raman | 210/708 |
| 4,588,508 | 5/1986 | Allenson et al. | 210/708 |
| 4,888,107 | 12/1989 | Easton et al. | 210/708 |
| 4,929,655 | 5/1990 | Takeda et al. | 524/458 |
| 5,004,559 | 4/1991 | Koerner et al. | 210/708 |
| 5,006,590 | 4/1991 | Takeda et al. | 524/458 |
| 5,476,522 | 12/1995 | Kerr et al. | 210/734 |

*Primary Examiner*—Peter A. Hruskoci
*Attorney, Agent, or Firm*—Robert A. Miller; Patricia A. Charlier; James J. Drake

[57] ABSTRACT

A method of removing waste oil from industrial oily waste water is disclosed. The method comprises the steps of adding to the oily waste water which includes oil, dispersed solids and emulsified water, an effective amount of a demulsifier which comprises a copolymer of a cationic monomer and a vinyl alkoxysilane; allowing the oil, emulsified water and dispersed solids to flocculate and separate into layers; and then removing the water layer from the treated waste water. The cationic monomer is selected from the group consisting diallyldimethylammonium halide, dimethylaminoethyl acrylate quaternary salt and dimethylaminoethyl methacrylate quaternary salt.

19 Claims, No Drawings

DEMULSIFICATION OF OILY WASTE WATERS USING SILICON CONTAINING POLYMERS

BACKGROUND OF THE INVENTION

In industry, oily waste waters are produced in various processes located in the steel and aluminum industries, chemical processing industry (CPI), automotive industry, laundry industry and refinery industry. In these industries, highly refined oils, lubricants and greases contact water for various purposes according to the particular industry. This results in a highly dispersed or severe oil-in-water emulsion in the waste water streams.

For example, in the steel and aluminum industries, waste water from steel and aluminum mills using hot rolling mills contain lubricating and hydraulic pressure hydrocarbons. Waste water from cold rolling mills contains oils that lubricates the sheets and reduces rust. Specifically, in cold rolling mills, oil-in-water emulsions are sprayed on the metal during rolling to act as coolants. Also, metalworking plants generate waste water streams containing lubricating and cutting oils, lapping and deburring compounds, grinding and other specialty fluids. These oils are generally highly refined hydrocarbons.

Refinery waste oil comes from two different sources: (1) Skimmings from the water clarification equipment, i.e., DAF's, API separators, and consisting mainly of crude oil; and, (2) Leakage from processes collected via traps and drains throughout the plant. This oil is usually sent to a waste water treatment plant.

One type of waste oil is formed during the process of removing dispersed oil from waste water in waste water treatment plants. The oil (called "float" or "skimmings") is concentrated in clarification vessels such as dissolved air floatation units (DAFs), induced gas floatation units (IGFs), corrugated plate interceptors (CPIs), and holding tanks. The oil floats to the top of these units, is removed by mechanical means and then stored. This waste oil may then be disposed of by incineration, sent to oil reclamation sites, or treated on-site. These waste oils have a minimum of 50% to 95% oil and contain emulsified water and solids which are stabilized by chemicals used to remove the oil from the waste water.

Waste waters from cotton and wool manufacturing plants contain oils and greases from the scouring, desizing and finishing operations. Finishing oils used in cotton and wool manufacturing to reduce friction and snagging of fibers on spinning machines end up in the waste water. Processes in other industries also generate oily waste water such as: paints, surface coatings, and adhesives; soaps and detergents; dyes and inks; and the leather industry. In each of the industries described above, the oils used in process ultimately contaminate waste water streams as highly dispersed or oil-in-water emulsions.

The emulsified oil in the waste water is typically present in the range of several hundred to tens of thousands of ppm. It is critical to remove this oil from an environmental standpoint. The United States Environmental Protection Agency has placed fight restrictions on total oil and grease (TOG) limits for water that is to be discharged into public drinking water supplies or into open bodies of water. The removal of this oil is very critical to the established discharge limits for total dissolved solids (TSS), carbon oxygen demand (COD), biological oxygen demand (BOD) and total organic carbon (TOC) into local sewers and rivers. Not only has the EPA established severe limits on the oil and grease discharge, these industries are affected by local city ordinances as well.

An emulsion is an intimate mixture of two liquid phases, such as oil and water, in which the liquids are mutually insoluble and where either phase may be dispersed in the other. An oily waste emulsion, in which oil is dispersed in the water phase, may contain any of a variety of oils in a wide range of concentrations. These oils are defined as substances that can be extracted from water by hexane, carbon tetrachloride, chloroform, or fluorocarbons: In addition to oils, typical contaminants of these emulsions may be solids, silt, metal particles, emulsifiers, cleaners, soaps, solvents, and other residues. The types of oils found in these emulsions will depend on the industry. They may be lubricants, cutting fluids, heavy hydrocarbons such as tars, grease, crude oils, and diesel oils, and also light hydrocarbons including gasoline, kerosene, and jet fuel. Their concentration in the waste water may vary from only a few pans per million to as much as 5 to 10% by volume.

A stable oil-in-water emulsion is a colloidal system of electrically charged oil droplets surrounded by an ionic environment. Emulsion stability is maintained by a combination of physical and chemical mechanisms.

Emulsions may be broken by chemical, electrolytic, or physical methods. The breaking of an emulsion is also called resolution, since the aim is to separate the original mixture into its parts. Chemicals are commonly used for the treatment of oily waste waters, and are also used to enhance mechanical treatment. In breaking emulsions, the stabilizing factors must be neutralized to allow the emulsified droplets to coalesce. The accumulated electric charges on the emulsified droplet are neutralized by introducing a charge opposite to that of the droplet. Chemical emulsion breakers provide this opposite charge, and are thus usually ionic in nature.

The treatment of oily waste water is normally divided into two steps, i.e., coagulation which is the destruction of the emulsifying properties of the surface active agent or neutralization of the charged oil droplet, and flocculation which is the agglomeration of the neutralized droplets into large, separable globules. The term oily waste water refers to an oil-in-water emulsion which may contain oil, dispersed solids, and water.

Traditionally, sulfuric acid has been used in oily waste treatment plants as the first step in emulsion breaking. Acid converts the carboxyl ion in surfactants to carboxylic acid, allowing the oil droplets to agglomerate. Chemical coagulating agents, such as salts of iron or aluminum, can be used in place of acid, with the additional benefit that these aid in agglomeration of the oil droplets. Some examples of inorganic emulsion breakers useful in oil-in-water emulsions are: polyvalent metal salts such as alum, $AlCl_3$, $FeCl_3$, and $Fe_2(SO_4)_3$, mineral acids such as $H_2SO_4$, HCl, and $HNO_3$, and adsorbents such as pulverized clay and lime. However, the aluminum or iron forms hydroxide sludges that are difficult to dewater. Acids generally break emulsions more effectively than coagulant salts, but the resultant acidic waste water must be neutralized after oil/water separation.

As described above, metal ions, such as, $Fe^{3+}$, $Zn^{2+}$, $Al^{3+}$, etc., have long been used to break oil-in-water emulsions, but recent government regulations have restricted their levels in discharged streams. Although effective at breaking oil-in-water emulsions, they too require another chemical to flocculate the oil.

Organic demulsifiers are extremely effective emulsion breaking agents, giving more consistent results and producing better effluent quality than an inorganic program. In many treatment plants, organic emulsion breakers have replaced traditional alum treatment for exactly those reasons. In addition to yielding a better quality effluent, organic emulsion breakers often require lower dosages than a corresponding inorganic treatment. Organic emulsion breakers reduce the amount of sludge generated in a treatment program by as much as 50 to 75%. Some examples of organic emulsion breakers useful in oily waste waters are polyamines, polyacrylates and their substituted copolymers.

Historically, dry polymers, solution polymers, and inverse emulsion latexes have been used to treat the waste water. Each material has its own advantages and disadvantages. While dry polymers have the benefit of being extremely concentrated, thereby reducing shipping costs, the equipment to dissolve the polymers is expensive and is not available to all end-users on site.

Water-in-oil emulsions of water-soluble vinyl addition polymers, referred to herein as latex polymers are used quite frequently, though they have several disadvantages. The first is that the latex polymer must be inverted prior to use, which complicates the process of feeding the polymer into the system. Numerous problems associated with this feeding method have caused many customers to avoid latex polymers. Additionally, the latexes generally have a very narrow treating range, often resulting in over-treatment at higher dosages. Furthermore, latex polymers add even more oil to the stream to be treated because latex polymer preparations include 30–35% solids dispersed in oil. Of course, adding more oil to the system is undesirable when treating waste water streams.

Although solution polymers require no prior make up, percent solids and molecular weight characteristics of these polymers are severely limited due to the nature of the material. These materials are often used to break oil-in-water emulsions, but they are unable to flocculate the dispersed oil, thus requiring an adjunct chemical to complete the process.

The water-soluble polymers of the invention offer many solutions to these problems and represent a new method for industrial waste water demulsification. While no particular form of the polymer is crucial for activity, for ease of handling the solution form of the copolymer is preferred.

The present inventors have developed various novel hydrophobically modified polyelectrolyte copolymers which may be used as demulsifiers for oily waste waters. These cationically charged hydrophobically modified polymers, which incorporate into the polymer backbone a vinyl alkoxysilane, exhibit improved performance or activity in demulsification than do conventional inorganic and organic treatments. The unique cationic and surface active polymers of this invention are advantageous over conventional polymers because they are capable of both increased surface activity, as evidenced by lowered surface tension, and adsorption onto hydrophobic surfaces.

The advantages of the diallyldimethylammonium chloride/vinyl trialkoxysilane copolymers stem from the fact that they have the following characteristics: 1) silicon components are capable of forming networks with other silicon moieties, similar to crosslinking; and 2) incorporated silicon functionalities are capable of adhering or adsorbing to hydrophobic surfaces. The hydrophobically associating copolymers of the instant invention demonstrate enhanced performance with replacement ratios on the order of 0.35–0.50 over current commercially available poly(DADMAC) treatments.

SUMMARY OF THE INVENTION

A method of removing waste oil from industrial oily waste water is disclosed. The method comprises the steps of adding to the oily waste water which includes oil, dispersed solids and emulsified water, an effective amount of a demulsifier which comprises a copolymer of cationic monomer and a vinyl alkoxysilane; allowing the oil, emulsified water and dispersed solids to flocculate and separate into layers; and then removing the water layer from the treated waste water. The cationic monomer is selected from the group consisting of diallyldimethyl ammonium halide, dimethylaminoethyl acrylate quaternary salt and dimethylaminoethyl methacrylate quaternary salt.

DESCRIPTION OF THE INVENTION

The vinyl alkoxysilane monomers useful in the copolymer composition of the invention contain an alkyl group of from 1–4 carbon atoms. As such vinyl trimethoxy, triethoxy, tripropoxy and tributoxysilanes, and combinations thereof, may find use in the subject invention. While vinyl trialkoxysilanes are preferred, the monomers may be mono or di-substituted as well, or mixtures of mono-, di- and trialkoxy substituted silanes may be used. A preferred vinyl trialkoxysilane for use in this invention is vinyl trimethoxysilane. Vinyl trimethoxysilane is commercially available from Hüls America; Piscataway, N.J.

Diallyldimethylammonium halides, especially diallyldimethylammonium chloride [DADMAC] are well-known and commercially available from a variety of sources. One method for the preparation of DADMAC is detailed in U.S. Pat. No. 4,151,202, the disclosure of which is hereinafter incorporated by reference into this specification.

The mole ratio of DADMAC to the vinyl trialkoxysilane ranges from 99.99:01 to 80:20 and, preferably from 99.9:0.1 to 85:15. Most preferably, the mole ratio of DADMAC to the vinyl trialkoxysilane range from 99.9:0.1 to 95.0:5.0.

The polymers may be prepared by conventional vinyl polymerization techniques. These techniques include conventional solution polymerization in water, and polymerization in water-in-oil emulsion form, such as that described in U.S. Pat. No. 3,624,019, the disclosure of which is hereinafter incorporated by reference into this specification. The polymers of the invention may also be prepared in so-called dispersion form, such as that described in U.S. Pat. Nos. 4,929,655 and 5,006,590, the disclosures of which are also hereinafter incorporated by reference into this specification. The polymers of the instant invention may be in solid, dispersion, latex or solution form.

Conventional free radical catalysis may be used including both free radical initiators and redox systems. Such polymerizations are within the purview of those skilled in the art and as such will not be elaborated on in this specification.

The molecular weights of the copolymer prepared hereunder can vary greatly. Generally, copolymers of diallyldimethylammonium chloride and vinyl trimethoxysilane produced hereunder will have a molecular weight of from 50,000 to 5,000,000, and preferably 75,000 to 2,500,000, and most preferably from 100,000 to 1,000,000. The polymers of this invention will accordingly have a reduced specific viscosity for a one percent by weight polymer solution as measured in one molar sodium nitrate of from 0.2–5 dl/gm and preferably from 0.5–4.0 dl/gm. A most preferred reduced specific viscosity range is from 0.7–3.0 dl/gm. While discussed herein as copolymers of diallyldimethylammonium halides and vinyl alkoxysilanes, other monomers may be incorporated into the resultant polymers without detracting from the spirit and intent of the invention.

Possible monomers that may be incorporated include, but are not limited to nonionic and cationic vinyl monomers. These materials are exemplified by acrylamide, and such cationic monomers as dimethylaminoethylmethacrylate and dimethylaminoethyl acrylate and their respective water soluble quaternary amine salts.

For example, the method of removing industrial oily waste water which include oil, dispersed solids and emulsified water, the method comprising the steps of: a) treating the oily waste water with an effective amount of a demulsifier which comprises a copolymer of a vinyl alkoxysilane and a cationic monomer selected from the group consisting of dimethylaminoethyl acrylate quaternary salt, dimethylaminoethyl methacrylate quaternary salt and diallyldimethylammonium halide; and then b) allowing the oil, emulsified water and dispersed solids to flocculate and separate into layers; and then c) removing the water layer from the treated waste water. The quaternary salt may be a $C_1$ to $C_{20}$ moiety selected from the group consisting of alkyl, aryl and alkylaryl. The quaternary salt may be methyl chloride quaternary salt and the vinyl alkoxysilane is vinyl trimethoxysilane. The demulsifier can have a reduced specific viscosity in one molar sodium nitrate solution for one percent polymer actives from 0.2–5.0 dl/gm. More preferably, the demulsifier has a reduced specific viscosity in one molar sodium nitrate solution for one percent polymer actives from 0.8–3.5 dl/gm. Most preferably, the demulsifier has a reduced specific viscosity in one molar sodium nitrate solution for one percent polymer actives from 1.5–3.0 dl/gm. The mole ratio of dimethylamino ethyl acrylate methyl chloride quaternary salt to vinyl trimethoxysilane may range from 99.9:0.1 to 95.0:5.0. Preferably, the mole ratio of dimethylaminoethyl acrylate methyl chloride quaternary salt to vinyl trimethoxysilane ranges from 99.5:0.5 to 96:4. Most preferably, the mole ratio of dimethyl aminoethyl acrylate methyl chloride quaternary salt to vinyl trimethoxysilane ranges from 99.5:0.5 to 98.0:2. The effective amount of the demulsifier added to the oily waste water may be at least 0.005% by weight of said fluid. Preferably, the effective amount of the demulsifier added to the oily waste water is at least 0.05% by weight of said fluid. Most preferably, the effective amount of the demulsifier added to the oily waste water is at least 0.1% by weight of said fluid.

When removal of waste oil from oil-in-water emulsions is effected by a chemical demulsifier such as the copolymer prepared hereunder, the emulsion-breaker is added to the suction side of the supply pump, or influent of a DAF unit. The effective amount will vary, depending upon the application and types of oils present. Waste oil, as described herein may encompass oils such as lubricants, grease and dispersed solids among others as described above. It does appear that dependent upon the particular system, a maximally effective dosage will be reached at a certain point. Above that dosage level, the polymer begins to overtreat the system, which causes a decrease in the clarity of the waste waters. The polymers of this invention may be added to the oily waste water in an effective amount of at least 0.005% by weight of said fluid, and preferably at least 0.05% of said fluid. A most preferred treatment range is at least 0.1% of the oily waste water.

Experiments

The following examples are presented to describe preferred embodiments and utilities of the invention and are not meant to limit the invention unless otherwise stated in the claims appended hereto.

EXAMPLE 1

A 90:10 mole percent copolymer of diallyldimethylammonium chloride (DADMAC) and vinyl trimethoxysilane (VTMS), at 20% actives, was prepared for use as a demulsifier for treatment of oily waste waters. The following reactants were used to form the demulsifier:

| | |
|---|---|
| 312.91 grams | Diallydimethylammonium Chloride (DADMAC) (a 58% Solution) |
| 18.89 grams | Vinyl Trimethoxysilane (VTMS) (a 98% Solution) |
| 200.0 grams | Deionized Water |
| 1.80 grams | [2,2'-Azobis (2-amidinopropane)] Dihydrochloride initiator |
| 20.0 grams | Sodium Chloride |
| 446.20 grams | Final Solution Water |
| 0.1 grams | Versene |

A semi-batch process was used to prepare the DADMAC/VTMS copolymer.

A 1.5 L reactor equipped with a mechanical stirrer, a thermocouple, nitrogen inlet/outlet tubes, a condenser and two syringe pumps were set up. Vinyl trimethoxysilane was taken in the first pump set at a delivery rate of 4.5 cc/hr. In the second pump, an aqueous solution of 2,2' azobis (2-amidinopropane) dihydrochloride (1–2 g in 48.8 g DI water) was taken and the pump was set at 12.5 sec/hr.

The DADMAC, sodium chloride, and Versene were charged into a polymerization reactor and heated to 52° C. The reaction mixture was purged with nitrogen. VTMS and initiator containing pumps were started and the polymerization was allowed to proceed.

A thick polymer started forming after about 2 hours. At the end of two and a half hours, the viscosity increased to a point where continued agitation was difficult. 200 ml of deionized water was then added. The reaction continued for a period of 5 hours, and then was subjected to a post treatment at 82° C. for 5 hours.

Product phase separated in two days and indicated extensive crosslinking as shown below:

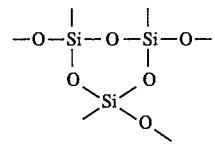

The phase separated product swelled in water, but was water-insoluble.

EXAMPLE 2

A 99.5/0.5 mole percent copolymer of diallyldimethylammonium chloride (DADMAC) and vinyl trimethoxysilane (VTMS), at 20% actives, was prepared for use as demulsifier for treatment of oily waste waters. The following reactants were used to form the copolymer:

| | |
|---|---|
| 321.13 grams | DADMAC (a 62% Solution) |
| 1.00 grams | VTMS (a 98% Solution) |
| 0.2 grams | Versene |
| 258.8 grams | Deionized Water |
| 1.20 grams | 2,2'-Azobis [2(2-imdazolin-2yl) propane] dihydrochloride initiator |
| 61.00 grams | Sodium Chloride |
| 356.87 grams | Dilution Water |

A batch process was used to prepare the DADMAC/VTMS copolymer. A reactor similar to the one described in Example 1 was used.

The DADMAC, VTMS, Versene, sodium chloride and deionized water were charged into a polymerization reactor at a temperature of 58° C. Thereafter, the initiator (0.6 grams in 49.4 grams deionized water) was charged into the reactor dropwise via a syringe pump at 12.5 cc/hours.

A thick polymer started forming after about 1.0 hour. At the end of 1.5 hours, the mixture was difficult to stir. At this point, deionized water addition was started using a syringe pump set at 70 ml/hour. The reaction continued for a period of 5.5 hours. After that, initiator (0.6 grams in 19.4 grams of deionized water) was added. The reactor was heated to 82° C. and held at that temperature for 3 hours. The reaction product was then diluted with 356.87 grams of water and stored. Reduced specific viscosity and intrinsic viscosity measurements were determined on a 1% polymer solution in $NaNO_3$ (sodium nitrate) and found to be 2.02/1.3 dl/gm respectively.

EXAMPLE 3

A 99.0/1.0 mole % DADMAC/VTMS copolymer was prepared using the procedure of Example 2. 2.0 g of VTMS and 355.07 g of DI water were used in place of the amounts in Example 2. All other quantities were the same. RSV/IV in a 1% solution by weight of the polymer in sodium nitrate were 2.2/1.2 dl/g, respectively. This material is hereinafter referred to as Example 3.

EXAMPLE 4

A procedure for the preparation of a 99/1 mole percent copolymer of DMAEA.MCQ and VTMS, 25% actives, is described below. Other polymer concentrations can be prepared following the same procedure.

| | |
|---|---|
| Dimethylamino ethyl acrylate methyl chloride quaternary salt (DMAEA.MCQ) monomer (79.7% actives) | 276.04 g |
| Sodium bisulfite (SBS) (1% solution in water) | 2.20 g |
| [2,2'-azobis (2-amidino propane)] dihydrochloride initiator (10% solution in water) | 2.20 g |
| Deionized water | 719.56 g |
| Vinyl trimethoxy silane (VTMS) (98%) | 2.00 g |
| Deionized water | 100.56 g |

In a 1.5 L reactor equipped with a condenser, nitrogen inlet, thermometer, thermocouple, nitrogen outlet and a stopper were placed the monomer and deionized water. The reactants were degassed for a period of 30 minutes by purging with nitrogen. During this period the reactor was also heated to 40° C. When the reactor temperature reached 40° C. VTMS was added followed by the addition of SBS, and initiator solutions. Afterwards, the reaction was allowed to proceed adiabatically. The external cooling of the reactor was shut off during this reaction. During the first few minutes (after the initiator addition) the reaction temperature rose to 43° C. The nitrogen purging was stopped three minutes after initiation. The reaction was then continued, and the reactor temperature gradually rose to 57°–59° C. over a period of 25–35 min. After this point, the reactor was heated externally to 50° C. and kept at this temperature for eight hours. The reactor was cooled to room temperature and diluted with the second batch of deionized water; the contents were transferred to a container for storage.

The same procedure was used in polymerizations carried out without any bisulfite. Additionally, the copolymerization was also carried out under isothermal conditions (48° C.) without any difficulty.

The product was characterized by RSV/IV measurement (1M $NaNO_3$ solution, 1% concentration), colloidal titration (0.0025 g of the product titrated against 0.0002N poly vinyl sulfuric acid potassium salt (PVSK), and residual monomer analysis.

The RSV of the product prepared above was measured as 2.53 dL/g; MW of this polymer as measured by multiple angle light scattering (MALS)=4M.

EXAMPLE 5

The jar test was used to evaluate the copolymer of diallyldimethylammonium chloride and vinyltrimethoxysilane synthesized by the method of Example 2 as a demulsifier in an oily waste water (API influent) from a refinery in the Midwest. The demulsifier was added to 100 ml of the waste water at the desired concentration and mixed using a Phipps and Bird gang stirrer for 2 minutes at 330 rpm and then mixed for 3 minutes at 30 rpm. The solution was then allowed to stand for 2 minutes. A subnatant aliquot was then drawn and the turbidity of the water was measured using a Hach ratio/xR turbidimeter. The results of the test are tabulated below in Table 1. For comparison purposes, the turbidity of the untreated oily waste water was measured at 400 NTU.

TABLE 1

| Turbidity of NTU of Waste water from a Midwestern Refinery | | |
|---|---|---|
| Dosage of | NTU | |
| Polymer (ppm) | poly(DADMAC) | poly(DADMAC/VTMS[1]) |
| 0.625 | — | 73 |
| 1.25 | 116 | 38 |
| 2.5 | 85 | 23 |
| 3.75 | 75 | 16 |
| 5 | 62 | 17 |
| 6.25 | 107 | 18 |
| 7.5 | 153 | 35 |
| 10 | — | 118 |
| 12.5 | — | 184 |

[1]= 99.5/0.5 mole percent poly(DADMAC/VTMS)

At a dose of 3.75 ppm the demulsifier lowers the water turbidity from 400 NTU to 16 NTU. Also, the new copolymer is more efficient and effective than commercially available poly (DADMAC) at reducing turbidity at every dosage level tested. This is illustrated by the decrease in turbidity as demonstrated by lower NTU readings for poly(DADMAC/VTMS) than for poly(DADMAC). Above a dosage of 7.5 ppm, the polymer begins to overtreat the system, as evidenced by an increase in NTU. This phenomena actually causes a decrease in the clarity of the waste water, a common occurrence for demulsifiers.

EXAMPLE 6

The jar test was used to evaluate the copolymer of diallyldimethylammonium chloride and vinyltrimethoxy silane synthesized by the method of Example 2 as a demulsifier in an oily waste water (dissolved air flotation influent) from a Southern refinery by the procedure described in Example 5. The results of the test are tabulated below in Table 2. For comparison purposes, the turbidity of the untreated oily-waste water was measured at 152 NTU.

TABLE 2

Turbidity in NTU of Waste water from a Southern Refinery

| poly-(DADMAC) Dose, ppm | NTU | Inorganic[2] Dose, ppm | NTU | poly(DADMAC/VTMS)[1] Dose, ppm | NTU |
|---|---|---|---|---|---|
| 5.63 | 27.5 | 18.75 | 66.5 | 7.5 | 9.9 |
| 7.5 | 29.5 | 22.5 | 43.8 | 10 | 7.3 |
| 9.38 | 18.3 | 26.25 | 38.5 | 12.5 | 6.8 |
| 11.25 | 25.5 | 30 | 33.8 | 15 | 4.1 |
| 13.13 | 19.8 | 33.75 | 40.9 | 17.5 | 4.3 |
| 15 | 13.4 | 37.5 | 31.9 | 20 | 4 |

[1] = 99.5/0.5 mole percent poly(DADMAC/VTMS)
[2] = poly(aluminum chloride)

The poly(DADMAC) and inorganic demulsifier were evaluated in their normal dosage ranges for this type of application. A much smaller amount of poly(DADMAC/VTMS) is required to achieve a less turbid waste water stream than in either of the two existing treatments. Therefore, the new copolymer shows superior performance to poly(DADMAC) and a commonly used inorganic demulsifier.

EXAMPLE 7

A jar test was used to evaluate the copolymer of diallyldimethylammonium chloride and vinyltrimethoxy silane synthesized by the method of Example 2 as a demulsifier in an oily waste water from a Southern chemical processing plant, by the procedure described in Example 5. The results of the test are tabulated below in Table 3. For comparison purposes, the turbidity of the untreated oily waste water was measured at 365 NTU.

TABLE 3

Turbidity in NTU of Waste water from a Southern Chemical Processing Plant

| Dosage of Polymer (ppm) | NTU poly(DADMAC) | NTU poly(DADMAC/VTMS)[1] |
|---|---|---|
| 1.25 | 324 | 177 |
| 2.5 | 231 | 81 |
| 3.75 | 195 | 77 |
| 5 | 241 | 66 |
| 6.25 | 264 | 100 |
| 7.5 | 280 | 130 |

[1] = 99.5/0.5 mole percent poly(DADMAC/VTMS)

Table 3 illustrates that at low dosages, poly(DADMAC/VTMS) is more efficient than poly(DADMAC) at demulsification. At 6.25 ppm, the polymer begins to overtreat the system. As previously noted, all demulsifiers cause a decrease in the clarity of the waste water above a certain dosage level.

EXAMPLE 8

A bottle test was used to evaluate the copolymer of diallyldimethylammonium chloride and vinyltrimethoxy silane synthesized by the method of Example 2 as a demulsifier in an oily waste water (from desalter unit) from a West Coast Refinery. The waste water was initially heated at 160° F. for 15 minutes in a water bath. The demulsifier was then added to 100 ml of the waste water at the desired concentration, thoroughly shaken and heated at 160° F. in the water bath for 20 minutes. The subnatant was then drawn and the turbidity of the water was measured using a Hach turbidimeter. The results of the test are tabulated below in Table 4. For comparison purposes, the turbidity of the untreated oily waste water was measured at more than 2000 NTU.

TABLE 4

Turbidity in NTU of Waste water from a West Coast Refinery

| Dosage of Polymer (ppm) | NTU poly(DADMAC) | NTU poly(DADMAC/VTMS[1]) |
|---|---|---|
| 10 | 163 | 124 |
| 12.5 | 133 | 107 |
| 20 | 101 | 89 |
| 25 | 152 | 110 |

[1] = 99.5/0.5 mole percent poly(DADMAC/VTMS)

The new copolymer reduced the turbidity of the waste water from more than 2000 NTU to 90 NTU at a dose of 20 ppm. Also, the performance of the copolymer was slightly better than poly(DADMAC). As in the previous examples, at a certain point (here 25 ppm) polymer is overtreated, causing a decrease in the clarity of the waste water.

EXAMPLE 9

TABLE 5

Turbidity in NTU of Wastewater from a Southern Refinery[1]

| Polymer Dosage (ppm) | NTU poly-(DADMAC) | NTU poly(DMAEA.MCQ/VTMS)[2] | NTU poly-(DADMAC/VTMS)[3] |
|---|---|---|---|
| 0.38 | 45 | | |
| 0.5 | | 38 | 36 |
| 0.56 | 38 | | |
| 0.75 | 40 | 31 | 28 |
| 0.94 | 30 | | |
| 1.0 | | 25 | 20 |
| 1.13 | 33 | | |
| 1.25 | | 20 | 19 |
| 1.5 | | 16 | 16 |

[1] = API Influent treated
[2] = 99.5/0.5 mole percent poly(DMAEA.MCQ/VTMS)
[3] = 99.5/0.5 mole percent poly(DADMAC/VTMS)

The jar test procedure of Example 5 was used to evaluate the copolymer of dimethyl amino ethyl acrylate methyl chloride quaternary salt (DMAEA.MCQ) and vinyl trimethoxysilane synthesized by the procedure of Example 4. The results of the test are enumerated in Table 5. Poly(DMAEA.MCQ/VTMS) appears to demulsify as well as poly (DADMAC/VTMS) and better than the conventional poly(DADMAC) treatment.

Changes can be made in the composition, operation and arrangement of the method of the present invention described herein without departing from the concept and scope of the invention as defined in the following claims:

We claim:

1. A method of removing waste oil from industrial oily waste water which includes oil, dispersed solids and emulsified water, the method comprising the steps of:

a) treating the oily waste water with an effective amount of a demulsifier which comprises a copolymer of diallyldimethylammonium halide and a vinyl alkoxysilane wherein the demulsifier has a reduced specific viscosity in one molar sodium nitrate solution for 1% polymer actives from 0.2–5 dl/gm and the mole ratio of diallyldimethylammonium halide to vinyl alkoxysilane ranges from 99.9:0.1 to 80:2.0; and b) allowing the oil, emulsified water and dispersed solids to flocculate and separate into layers; and then c) removing the water layer from the oily waste water layer.

2. The method of claim 1 wherein the diallyldimethylammonium halide is diallyldimethylammonium chloride and the vinyl alkoxysilane is vinyl trimethoxysilane.

3. The method of claim 2 wherein the demulsifier has a reduced specific viscosity in one molar sodium nitrate solution for one percent polymer actives from 0.5–4.0 dl/gm.

4. The method of claim 2 wherein the demulsifier has a reduced specific viscosity in one molar sodium nitrate solution for one percent polymer actives from 0.7–3.0 dl/gm.

5. The method of claim 2 wherein the mole ratio of diallyldimethylammonium chloride to vinyl trimethoxysilane ranges from 99.9:0.1 to 85:15.

6. The method of claim 2 wherein the mole ratio of diallyldimethylammonium chloride to vinyl trimethoxysilane ranges from 99.9:0.1 to 95.0:5.0.

7. The method of claim 2 wherein the effective amount of the demulsifier added to the oily waste water is at least 0.005% by weight of said fluid.

8. The method of claim 2 wherein the effective amount of the demulsifier added to the oily waste water is at least 0.05% by weight of said fluid.

9. The method of claim 2 wherein the effective amount of the demulsifier added to the oily waste water is at least 0.1% by weight of said fluid.

10. A method of removing waste oil from industrial oily waste water which includes oil, dispersed solids and emulsified water, the method comprising the steps of:

a) treating the oily waste water with an effective amount of a demulsifier which comprises a copolymer of a vinyl alkoxysilane and a cationic monomer selected from the group consisting of dimethylaminoethyl acrylate quaternary salt and dimethylaminoethyl methacrylate quaternary salt; wherein the demulsifier has a reduced specific viscosity in one molar sodium nitrate solution for 1% polymer actives from 0.2–5.0 dl/gm and wherein the mole ratio of cationic monomer to vinyl alkoxysilane ranges from 99.5:0.1 to 95:5.0; and then b) allowing the oil, emulsified water and dispersed solids to flocculate and separate into layers; and then c) removing the water layer from the oily waste water layer.

11. The method of claim 10 wherein the quaternary salt is a $C_1$ to $C_{20}$ moiety selected from the group consisting of alkyl, aryl and alkylaryl.

12. The method of claim 11 wherein the quaternary salt is methyl chloride quaternary salt and the vinyl alkoxysilane is vinyl trimethoxysilane.

13. The method of claim 12 wherein the mole ratio of dimethylaminoethyl acrylate methyl chloride quaternary salt to vinyl trimethoxysilane ranges from 99.5:0.5 to 96:4.

14. The method of claim 12 wherein the mole ration of dimethyl aminoethyl acrylate methyl chloride quaternary salt to vinyl trimethoxysilane ranges from 99.5:0.5 to 98:2.

15. The method of claim 12 wherein the effective amount of the demulsifier added to the oily waste water is at least 0.005% by weight of said fluid.

16. The method of claim 12 wherein the effective amount of the demulsifier added to the oily waste water is at least 0.05% by weight of said fluid.

17. The method of claim 12 wherein the effective amount of the demulsifier added to the oily waste water is at least 0.1% by weight of said fluid.

18. The method of claim 10 wherein the demulsifier has a reduced specific viscosity in one molar sodium nitrate solution for one percent polymer actives from 0.8–3.5 dl/gm.

19. The method of claim 10 wherein the demulsifier has a reduced specific viscosity in one molar sodium nitrate solution for one percent polymer actives from 1.5–3.0 dl/gm.

* * * * *

UNITED STATES PATENT AND TRADEMARK OFFICE
CERTIFICATE OF CORRECTION

PATENT NO. : 5,560,832
DATED : OCTOBER 1, 1996
INVENTOR(S) : A. SIVAKUMAR & MANIAN RAMESH

It is certified that error appears in the above-indentified patent and that said Letters Patent is hereby corrected as shown below:

CLAIM 1, COLUMN 11, LINE 10 ranges from 99.9:0.1 to 80:2,0; and

LETTERS PATENT SHOULD READ AS:

ranges from 99.9:0.1 to 80:20; and

CLAIM 10, COLUMN 11-12, LINE 8 vinyl alkoxysilane ranges from 99.5:0.1 to 95:5.0; and

LETTERS PATENT SHOULD READ AS:

vinyl alkoxysilane ranges from 99.9:0.1 to 95:5.0: and

Signed and Sealed this

Eighth Day of April, 1997

Attest:

BRUCE LEHMAN

Attesting Officer

Commissioner of Patents and Trademarks